(12) United States Patent
Deng et al.

(10) Patent No.: US 12,515,217 B2
(45) Date of Patent: Jan. 6, 2026

(54) HIGH-THROUGHPUT TEST CHIP

(71) Applicants: Beijing BOE Technology Development Co., Ltd., Beijing (CN); BOE Technology Group Co., Ltd., Beijing (CN)

(72) Inventors: Ruijun Deng, Beijing (CN); Zhukai Liu, Beijing (CN); Ding Ding, Beijing (CN)

(73) Assignees: Beijing BOE Technology Development Co., Ltd., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 825 days.

(21) Appl. No.: 17/789,263

(22) PCT Filed: Aug. 27, 2021

(86) PCT No.: PCT/CN2021/114993
§ 371 (c)(1),
(2) Date: Jun. 27, 2022

(87) PCT Pub. No.: WO2023/024068
PCT Pub. Date: Mar. 2, 2023

(65) Prior Publication Data
US 2024/0181443 A1    Jun. 6, 2024

(51) Int. Cl.
*B01L 3/00* (2006.01)
*B01L 7/00* (2006.01)
*C12Q 1/6851* (2018.01)

(52) U.S. Cl.
CPC ....... *B01L 3/5023* (2013.01); *B01L 3/502753* (2013.01); *B01L 7/52* (2013.01);
(Continued)

(58) Field of Classification Search
CPC .... B01L 3/502753; B01L 7/52; B01L 3/5023; C12Q 1/6851
See application file for complete search history.

(56) References Cited

U.S. PATENT DOCUMENTS

2011/0236264 A1* 9/2011 Rajagopal ......... B01L 3/502761
209/132
2017/0297029 A1* 10/2017 DeVoe .................... B01L 7/52
(Continued)

FOREIGN PATENT DOCUMENTS

CN        107262170 A    10/2017
CN        208200912 U    12/2018
(Continued)

OTHER PUBLICATIONS

"DPCR: A Technology Review", Quan et al., Sensors 2018, 18, 1271, pp. 1-27.
(Continued)

*Primary Examiner* — Elizabeth A Robinson
*Assistant Examiner* — Tingchen Shi
(74) *Attorney, Agent, or Firm* — ArentFox Schiff LLP; Michael Fainberg

(57) ABSTRACT

A high-throughput test chip includes: a backplane, a cover plate and a connector. The backplane and the cover plate are aligned to form a plurality of accommodation chambers. Test chip units are disposed on one side of the backplane facing the cover plate, and each of the test chip units is located in the corresponding accommodation chamber. Each of the accommodation chambers is provided with a liquid inlet and a liquid outlet. The connector includes pipelines; each of the pipelines is provided with a valve structure configured to control connection or disconnection of the pipeline. In each pair of a pipeline and an accommodation chamber, an inlet of the pipeline communicates with the liquid outlet of the accommodation chamber; the pipelines
(Continued)

form at least one pipeline group, each pipeline group at least includes two pipelines, and the pipelines in each pipeline group share the same sample liquid outlet.

18 Claims, 13 Drawing Sheets

(52) U.S. Cl.
CPC ........ *C12Q 1/6851* (2013.01); *B01L 2200/16* (2013.01); *B01L 2300/069* (2013.01); *B01L 2300/0816* (2013.01); *B01L 2300/161* (2013.01); *B01L 2300/18* (2013.01)

(56) References Cited

U.S. PATENT DOCUMENTS

| | | | |
|---|---|---|---|
| 2021/0322992 A1* | 10/2021 | Kornilovich | B01L 3/502761 |
| 2022/0241774 A1* | 8/2022 | Zhao | G01N 35/00009 |

FOREIGN PATENT DOCUMENTS

| | | |
|---|---|---|
| CN | 109894163 A | 6/2019 |
| CN | 110193385 A | 9/2019 |
| CN | 110426526 A | 11/2019 |
| CN | 111778156 A | 10/2020 |
| CN | 112834763 A | 5/2021 |
| CN | 113109297 A | 7/2021 |
| WO | 2020147013 A1 | 7/2020 |

OTHER PUBLICATIONS

"Microfluidics for Biomedical Analysis" Yang et al., Small Methods 2019, 1900451, pp. 1-30.

* cited by examiner

HIGH-THROUGHPUT TEST CHIP

CROSS-REFERENCE TO RELATED APPLICATION

This application is a national phase entry under 35 U.S.C. § 371 of International Application No. PCT/CN2021/114993, filed on Aug. 27, 2021, the entire content of which is incorporated herein by reference.

TECHNICAL FIELD

The disclosure relates to the technical field of biomedicine, in particular to a high-throughput test chip.

BACKGROUND

Polymerase chain reaction (PCR) is used in molecular biology to make many copies of (amplify) a particular section of DNA and can greatly increase the amount of DNA. A digital polymerase chain reaction (dPCR) chip technology, different from a traditional PCR technology, is a quantitative analysis method for providing digital DNA quantification information and has shown remarkable advantages in a plurality of fields since it is proposed, dPCR has the advantages of high sensitivity, strong specificity, high test throughput, accurate quantification and the like and is thus widely applied to aspects of clinical diagnosis, genetic instability analysis, single cell gene expression, environmental microbiological detection, prenatal diagnosis and the like.

SUMMARY

An embodiment of the disclosure provides a high-throughput test chip, including: a backplane, a cover plate and a connector. The backplane is opposite to the cover plate, and the backplane and the cover plate are aligned to form a plurality of accommodation chambers. The backplane comprises test chip units in one-to-one correspondence with the plurality of accommodation chambers disposed on a side of the backplane facing the cover plate, and each of the test chip units is located in a corresponding accommodation chamber. Each of the accommodation chambers is provided with a liquid inlet and a liquid outlet. The connector comprises pipelines in one-to-one correspondence with the plurality of accommodation chambers, and each of the pipelines comprises a valve structure for controlling connection or disconnection of the pipeline. For each pair of a pipeline and an accommodation chamber corresponding to the pipeline, an inlet of the pipeline communicates with an liquid outlet of the accommodation chamber corresponding to the pipeline. The pipelines form at least one pipeline group, where each pipeline group at least includes two pipelines, and the pipelines in each of the pipeline groups share a same sample liquid outlet.

In the high-throughput test chip provided by the above technical solution, the backplane and the cover plate which are opposite to each other are matched to form the plurality of accommodation chambers, each accommodation chamber is internally provided with a test chip unit. During a specific test, according to actual demands, a valve structure on the pipeline corresponding to the accommodation chamber to be used is opened, when the accommodation chambers corresponding to other pipelines in the same pipeline group as the pipeline are not used, the valve structures on the pipelines corresponding to the accommodation chambers not used may be closed. If all the accommodation chambers corresponding to the same pipeline group need to be used, the valve structures on all the pipelines in the pipeline group are opened; then sample liquid is injected into the accommodation chamber through the liquid inlet which the corresponding accommodation chamber has, so the sample liquid can enter each reaction chamber of the test chip unit arranged in the accommodation chamber, so that a subsequent test is facilitated. Besides, when packaging separation needs to be performed on each reaction chamber in the test chip unit in the accommodation chamber where the sample liquid is injected, superfluous sample liquid may be output from a sample liquid outlet of a pipeline group to which the corresponding pipelines belong.

It can be seen according to the above analysis that in the high-throughput test chip provided by the above solution, the accommodation chambers to be used can be flexibly selected through adjustment by the valve structures. Moreover, the sample liquid can be prevented from entering the accommodation chamber which is in an idle state and causing contamination, as such, in a subsequent use process, a possibility of contaminating all the accommodation chambers is quite small, and a test accuracy of the corresponding accommodation chambers during usage can be improved.

Optionally, the backplane and the cover plate are connected through a sealant layer, and the accommodation chambers are separated by the sealant layer.

Optionally, the liquid outlets of the accommodation chambers are formed in the cover plate, the pipelines in the connectors are connecting pipes, and each of the connecting pipes is located on a side of the cover plate facing away from the backplane.

Optionally, the sealant layer includes a first groove formed on a surface of the sealant layer facing away from the backplane, where the first groove includes a groove bottom, two opposite side walls, and an opening facing the cover plate. The cover plate covers the first groove, a surface of the cover plate facing the backplane and the first groove are matched to form the pipeline of the connector, an end of the pipeline communicating with the accommodation chambers forms the liquid outlet of the accommodation chamber. A sample liquid outlet which is in one-to-one correspondence with the pipeline group is formed in the cover plate.

Optionally, the valve structure includes an air valve.

Optionally, in each pair of mutually corresponding air valve and pipeline: the air valve includes an elastic valve sheet, wherein an edge of the elastic valve sheet is in seal fit with the cover plate so that the elastic valve sheet and the cover plate are matched to form a pneumatic control chamber: an orthographic projection of the elastic valve sheet on the sealant layer covers the first groove in an arrangement direction of the two side walls: the cover plate is provided with a through hole, and the through hole communicates with the pneumatic control chamber and is configured as a pneumatic control air inlet: and when air with a set pressure is injected into the pneumatic control chamber from the pneumatic control air inlet, the elastic valve sheet is configured to deform so as to extend into the first groove and be attached to the groove bottom and the two side walls of the first groove.

Optionally, in each pair of mutually corresponding air valve and pipeline, an orthographic projection of the pneumatic control air inlet on the backplane does not overlap with an orthographic projection of the first groove on the backplane.

Optionally, at least one card slot is formed in a surface of the backplane facing the cover plate, and the test chip unit is installed in the card slot.

Optionally, the test chip unit is formed on the surface of the backplane facing the cover plate.

Optionally, the cover plate is provided with flexible elastic films in one-to-one correspondence with the accommodation chambers on a side of the cover plate facing the backplane. The flexible elastic film is located in the accommodation chamber, and an edge of the flexible elastic film is in seal connection with a surface of the cover plate facing the backplane so that an air channel space is formed between the flexible elastic film and the cover plate. In each pair of mutually corresponding flexible elastic film and accommodation chamber, an orthographic projection of the flexible elastic film on the backplane covers the test chip unit in the accommodation chamber, and an orthographic projection of the liquid inlet and the liquid outlet of the accommodation chamber on the backplane does not overlap with an orthographic projection of the air channel space on the backplane. The cover plate comprises an air inlet and an air outlet running through a thickness direction of the cover plate in a region corresponding to the air channel space. The air inlet and the air outlet communicate with only the air channel space, so that the flexible elastic film deforms when air is injected from the air inlet to cover all the reaction chambers of the test chip units.

Optionally, in the accommodation chamber, an orthographic projection of the air inlet and the air outlet in the cover plate on the backplane does not overlap with an orthographic projection of the test chip unit on the backplane.

Optionally, the edge of the flexible elastic film is in bonding connection with the surface of the cover plate facing the backplane.

Optionally, a thickness of the flexible elastic film is 5 μm to 90 μm.

Optionally, the cover plate includes an air injecting groove in a surface of a part of the cover plate corresponding to the air channel space facing the backplane. The flexible elastic film covers an opening of the air injecting groove, and the orthographic projection of the air inlet and the air outlet on the backplane is located in an orthographic projection of the air injecting groove on the backplane.

Optionally, in the accommodation chamber, a projection of the air injecting groove on the backplane covers all the reaction chambers of the test chip unit in the accommodation chamber.

Optionally, in a direction perpendicular to the cover plate, a depth of the air injecting groove is 20 μm to 1000 μm.

Optionally, the plurality of card slots are arranged in array.

Optionally, the plurality of card slots are arranged annularly with the sample liquid outlet of the connector as a center.

Optionally, the test chip unit further includes a temperature control layer: and the temperature control layer is disposed on the backplane and configured to heat the plurality of reaction chambers.

Optionally, the test chip unit further includes a voltage control unit, and the voltage control unit is electrically connected with the temperature control layer.

Figure 1:
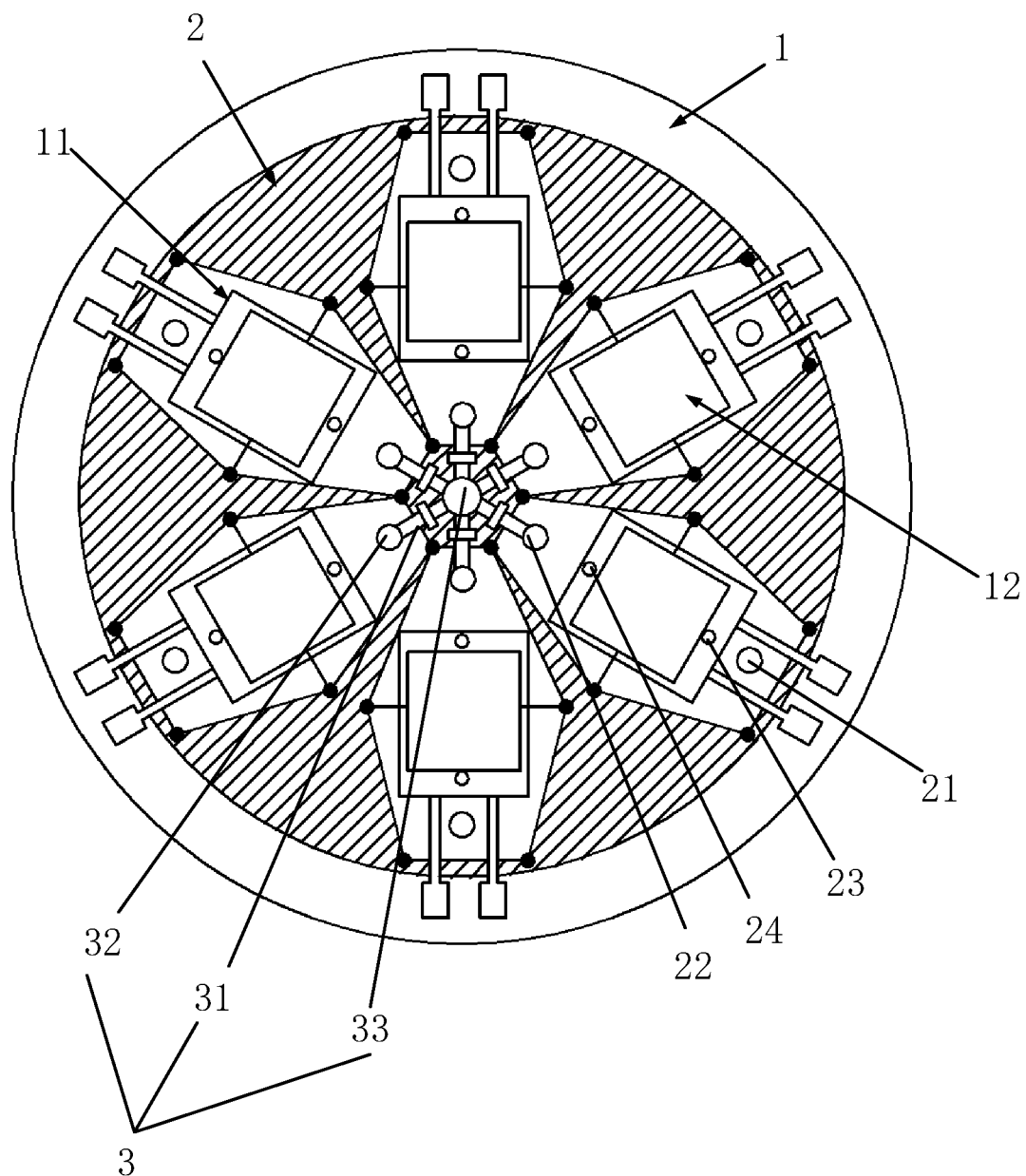
FIG. 1 is a schematic top view of a high-throughput test chip provided by an embodiment of the disclosure.

In the drawings:
1—backplane: 11—accommodation chamber: 12—test chip unit: 120—reaction chamber; 121—control circuit: 1211—voltage control unit: 122—first passivation layer: 1221—via hole; 123—temperature control layer: 124—second passivation layer: 125—black matrix: 126—defining layer: 127—hydrophilic layer: 128—first substrate: 2—cover plate: 21—liquid inlet: 22—liquid outlet; 23—air inlet: 24—air outlet: 25—flexible elastic film: 26—air channel space: 261—third passivation layer: 27—second substrate: 3—connector: 31—pipeline: 311—valve structure: 3111—pneumatic control chamber: 3112—pneumatic control air inlet: 3113—elastic valve sheet: 32—inlet: 33—sample liquid outlet: 5—sealant layer.

DETAILED DESCRIPTION

The technical solution in the embodiments of the disclosure will be described clearly and completely below with reference to the accompanying drawings in the embodiments of the disclosure. Apparently, the described embodiments are only some but not all of the embodiments of the disclosure. Based on the embodiments in the disclosure, all other embodiments obtained by those ordinarily skilled in the art without creative work fall within the protection scope of the disclosure.

Digital PCR can, by using a microfluidics technology, disperse to-be-tested liquid and a PCR reagent mixture in all micro reaction chambers in test chip units to perform independent PCR amplification on a target molecule in each reaction chamber.

Figure 2:
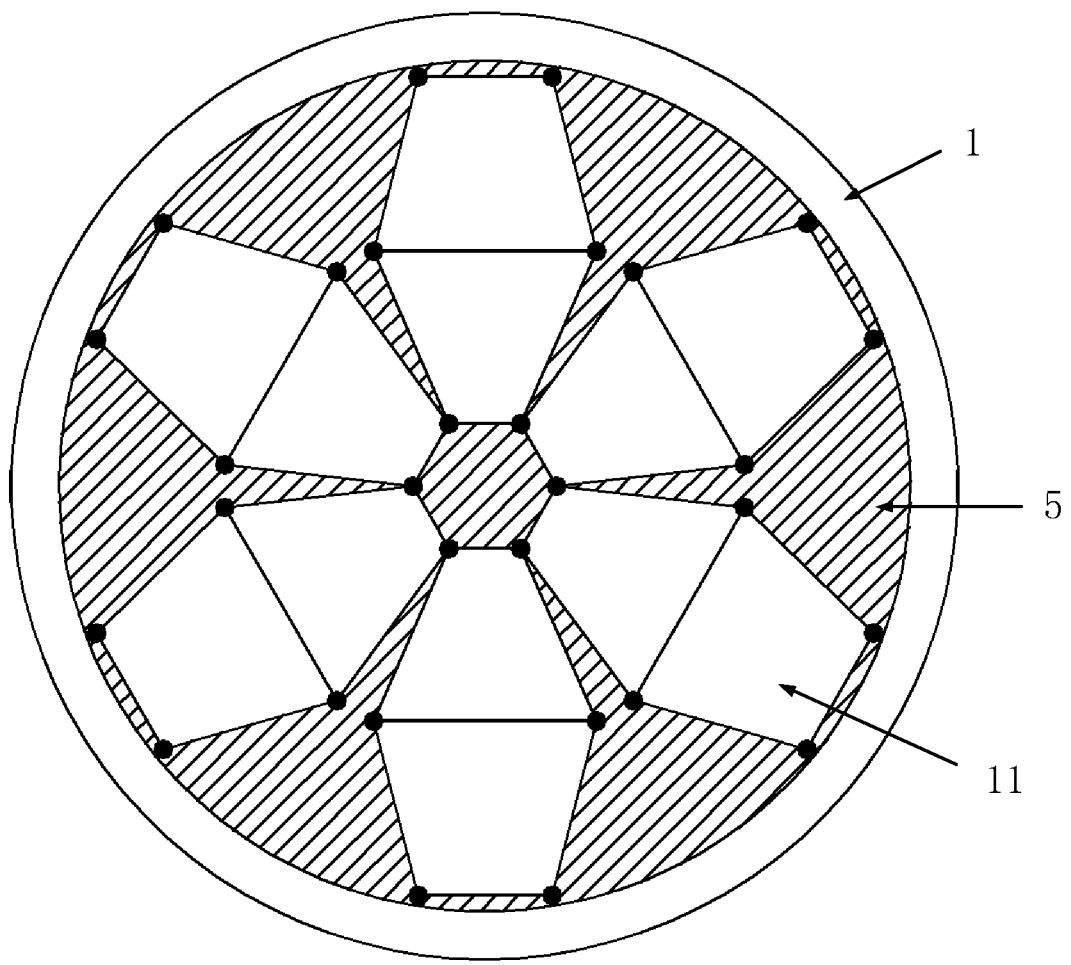
FIG. 2 is a schematic structural diagram of a backplane in the high-throughput test chip shown in FIG. 1.
Figure 3:
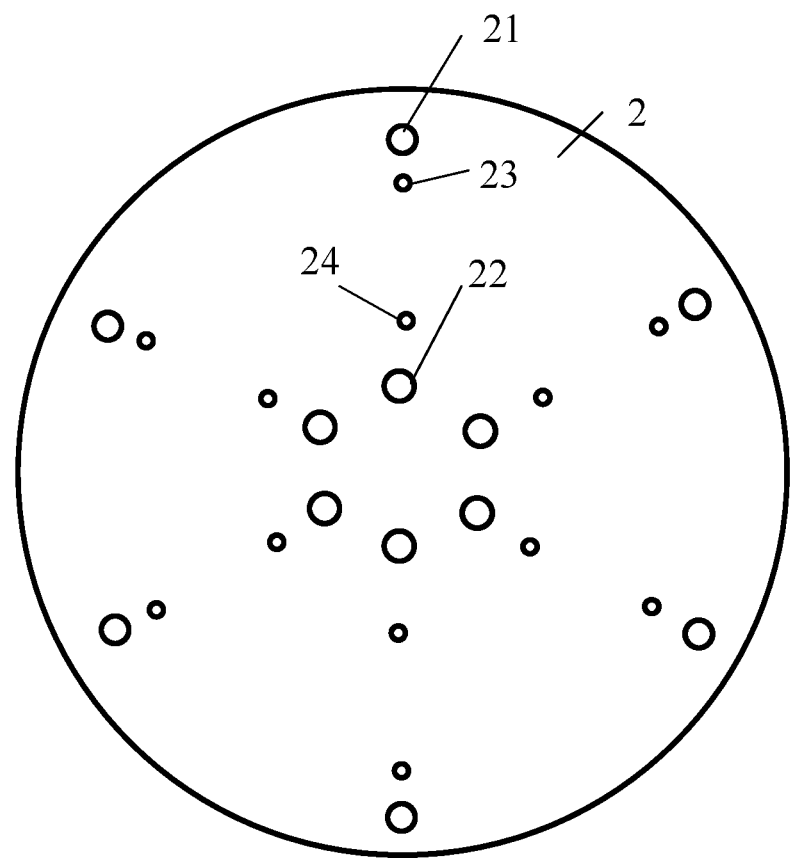
FIG. 3 is a schematic structural diagram of a cover plate in the high-throughput test chip shown in FIG. 1.

As shown in FIG. 1, also referring to FIG. 2 and FIG. 3, a high-throughput test chip provided by an embodiment of the disclosure includes: a backplane 1, a cover plate 2 and a connector 3.

The backplane 1 and the cover plate 2 are opposite to each other and are aligned to form a plurality of accommodation chambers 11, test chip units 12 in one-to-one correspondence with the accommodation chambers 11 are disposed on a side of the backplane 1 facing the cover plate 2, and each of the test chip units 12 is located in the corresponding accommodation chamber 11: each of the accommodation chambers 11 is provided with a liquid inlet 21 and a liquid outlet 22.

The connector 3 includes pipelines 31 in one-to-one correspondence with the accommodation chambers 11: each of the pipelines 31 is provided with a valve structure 311 for controlling connection or disconnection of the pipeline: in each pair of a pipeline 31 and an accommodation chamber 11 which correspond to each other, an inlet 32 of the pipeline 31 communicates with the liquid outlet 22 of the accommodation chamber 11. The plurality of pipelines 31 form at least one pipeline group, each pipeline group at least includes two pipelines 31, and the pipelines 31 in each pipeline group share the same sample liquid outlet 33.

In the high-throughput test chip provided by the above technical solution, the backplane 1 and the cover plate 2 which are opposite to each other are matched to form the plurality of accommodation chambers 11, and each accommodation chamber 11 is internally provided with a test chip unit 12. During a specific test, according to actual demands, a valve structure 311 on the pipeline 31 corresponding to the accommodation chamber 11 to be used is opened, and meanwhile, when the accommodation chambers 11 corresponding to other pipelines in the same pipeline group as the pipeline 31 are not used, the valve structures 311 on the pipelines 31 corresponding to the accommodation chambers 11 not used may be closed. If all the accommodation chambers 11 corresponding to the same pipeline group need to be used, the valve structures 311 on all the pipelines 31 in the pipeline group are opened: then sample liquid is injected into the accommodation chamber 11 through the liquid inlet 21 which the corresponding accommodation chamber 11 has, so the sample liquid can enter each reaction chamber of the test chip unit 12 in the accommodation chamber 11, so that a subsequent test is facilitated. Besides, when packaging separation needs to be performed on each reaction chamber in the test chip unit in the accommodation chamber 11 where the sample liquid is injected, superfluous sample liquid may be output from a sample liquid outlet 33 of a pipeline group to which the corresponding pipelines 31 belong.

Figure 5:
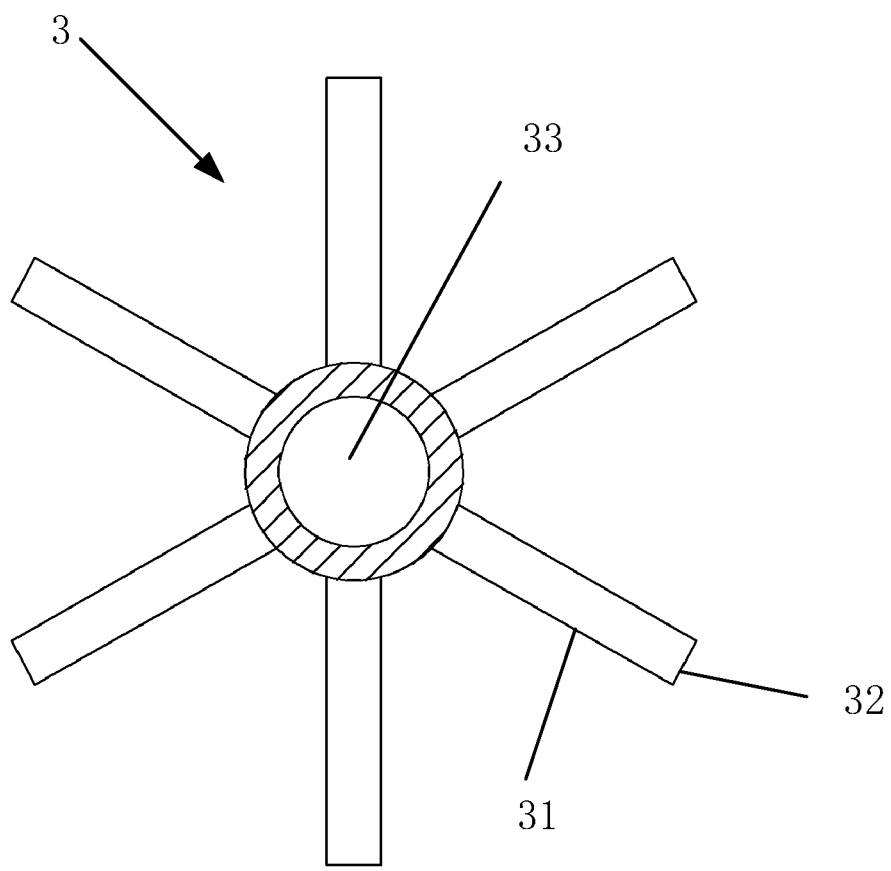
FIG. 5 is a schematic structural diagram of a connector in the high-throughput test chip shown in FIG. 1.
Figure 6:
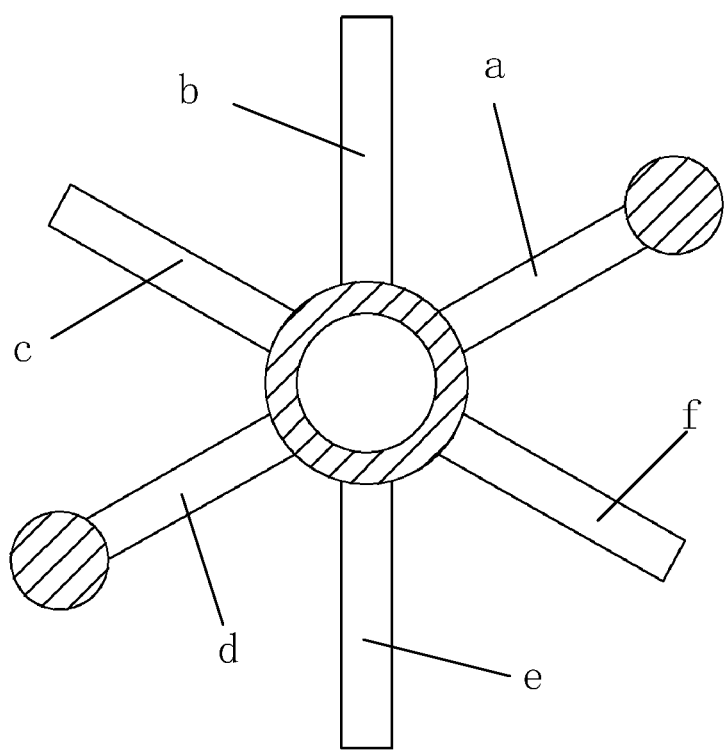
FIG. 6 is a schematic diagram of connection-disconnection options of each pipeline in the connector shown in FIG. 5.
Figure 7:
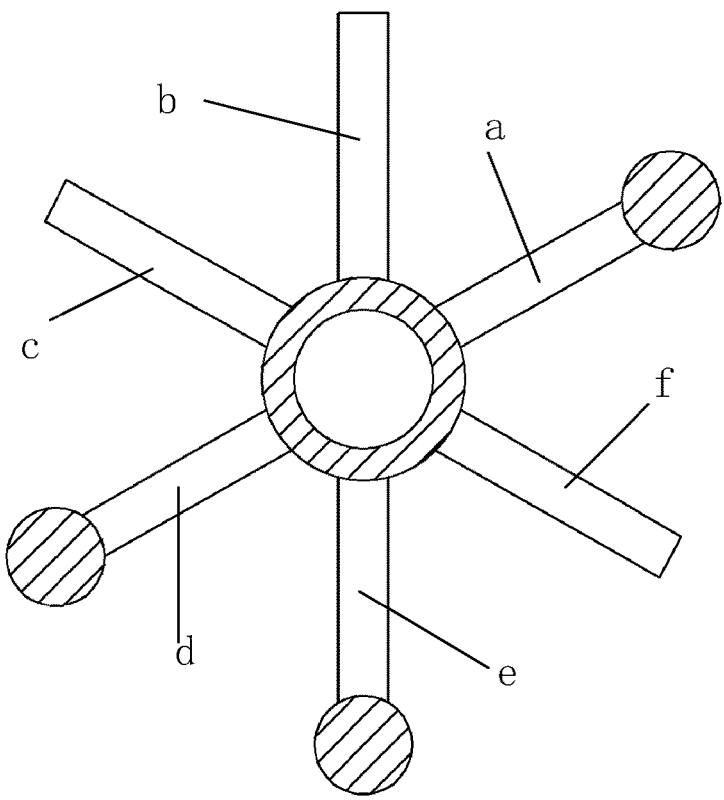
FIG. 7 is a schematic diagram of another connection-disconnection selection of each pipeline in the connector shown in FIG. 5.

Selection of the pipelines in the connector 3 may be introduced by taking a connector 3 of a high-throughput test chip shown in FIG. 1 as an example. Please refer to FIG. 5. FIG. 6 and FIG. 7, an inlet 32 is formed in an end of the pipeline 31 in the connector 3, and the other end of the pipeline 31 communicates with the sample liquid outlet 33. In some embodiments, the connector 3 includes six pipelines, namely, a pipeline a, a pipeline b, a pipeline c, a pipeline d, a pipeline e and a pipeline f respectively. Under a working condition, as shown in FIG. 6, the valve structures on the pipeline a and the pipeline d are closed, and the valve structures on the pipeline b, the pipeline c, the pipeline e and the pipeline f are opened. Under another working condition, as shown in FIG. 7, the valve structures on the pipeline a, the pipeline d and the pipeline e are closed, and the valve structures on the pipeline b, the pipeline c and the pipeline f are opened.

It can be seen according to the above analysis that in the high-throughput test chip provided by the above solution, the accommodation chambers 11 to be used can be flexibly selected through adjustment by the valve structures 311. Moreover, the sample liquid can be prevented from entering the accommodation chamber which is in an idle state and causing contamination. As such, in a subsequent use process, possibility of contaminating all the accommodation chambers is quite small, and the test accuracy of the corresponding accommodation chambers during usage can be improved.

Figure 4:
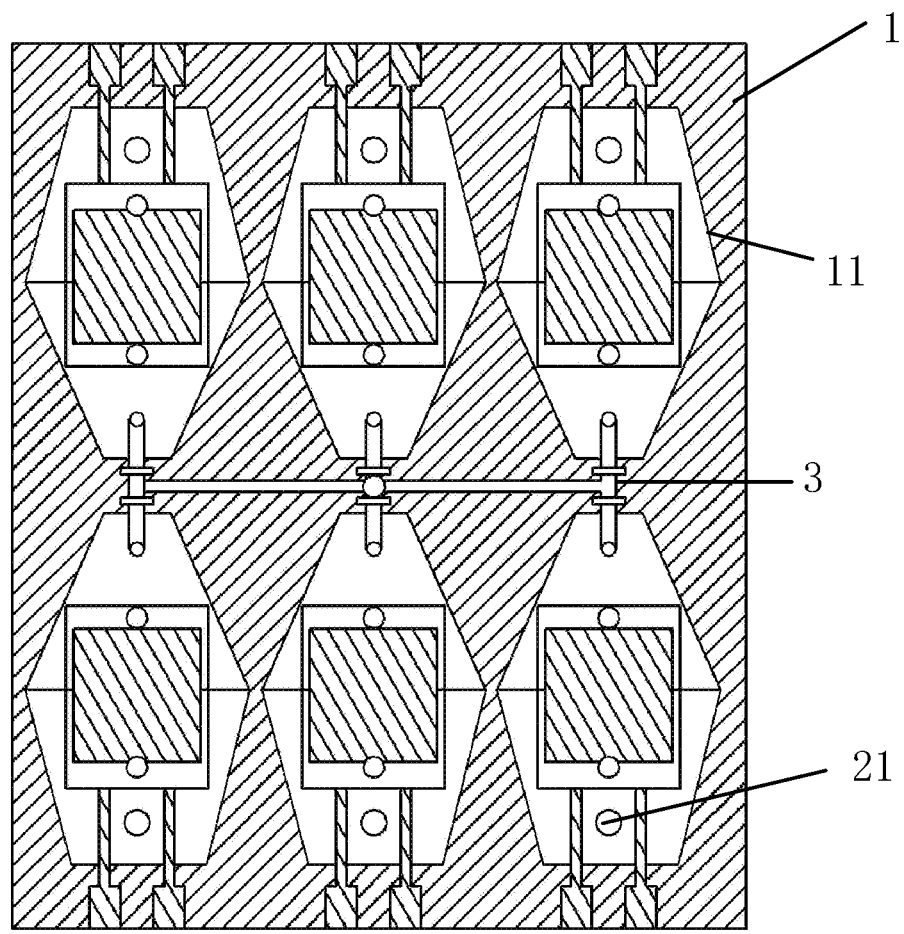
FIG. 4 is a schematic top view of a high-throughput test chip provided by an embodiment of the disclosure.

In the high-throughput test chip provided in FIG. 1 and FIG. 4, the plurality of pipelines 31 which the connector 3 has form a pipeline group, that is, the connector in FIG. 1 and FIG. 4 each have six pipelines 31, and the six pipelines 31 share the same sample liquid outlet 33. In some embodiments, the plurality of pipelines 31 which the connector 3 has may form two pipeline groups or more pipeline groups, taking the connector having six pipelines as an example:

the six pipelines 31 may form two pipeline groups, one of the pipeline groups includes two pipelines, and the other pipeline group includes four pipelines, or the two pipeline groups each include three pipelines;

the six pipelines 31 may form three pipeline groups, and each of the pipeline groups includes two pipelines.

Certainly, the plurality of pipelines included in the connector 3 may be distributed according to actual demands.

The plurality of pipelines 31 in the connector 3 may be grouped and distributed according to actual demands, and flexibility of the above high-throughput test chip during use can be further improved.

In the high-throughput test chip provided by the above embodiment, the accommodation chambers 11 formed by aligning the backplane 1 to the cover plate 2 may have a plurality of distribution modes as the following examples.

Mode 1, the accommodation chambers 11 may be in a distribution mode shown in FIG. 1, an orthographic projection of the sample liquid outlet 33 on a surface of the cover plate 2 away from the backplane 1 is located in a center of the cover plate 2, an orthographic projection of the plurality of accommodation chambers 11 on the surface of the cover plate 2 away from the backplane 1 is uniformly distributed in a circumferential direction around the center of the cover plate 2, and meanwhile, orthographic projections of the connectors 3 on the cover plate 2 form a radial pattern with the center of the cover plate 2 as a center, as shown in FIG. 1.

Mode 2, the accommodation chambers 11 may also be in a distribution mode shown in FIG. 4, namely, distributed in an array with two rows and three columns. In this case, a specific structure of the connector 3 is also modified, for example, the pipelines 31 are located between the two rows of accommodation chambers 11 and connected to the sample liquid outlet 33 through a main pipeline, for example, a structure shown in FIG. 4.

On the basis of the high-throughput test chip provided by the above implementation, the plurality of above accommodation chambers may be formed specifically in the following mode, please refer to FIG. 8 and FIG. 9 by combining with FIG. 1 and FIG. 2, in the implementation, the backplane 1 and the cover plate 2 are connected through a sealant layer 5, and the accommodation chambers 11 are formed through separation by the sealant layer 5. In the high-throughput test chip provided by the implementation, the plurality of above accommodation chambers 11 are formed between the backplane 1 and the cover plate 2 through separation by the sealant layer 5, a special structure does not need to be fabricated on the backplane 1 or the cover plate 2 for forming the above accommodation chambers 11, and preparation is convenient, and a whole structure of the high-throughput test chip can be simplified.

In some embodiments, on the basis of the high-throughput test chip provided by each of the above implementations, in the above high-throughput test chip, there may be various arrangement structures of the accommodation chambers 11 and the connector 3 as following examples.

Figure 8:
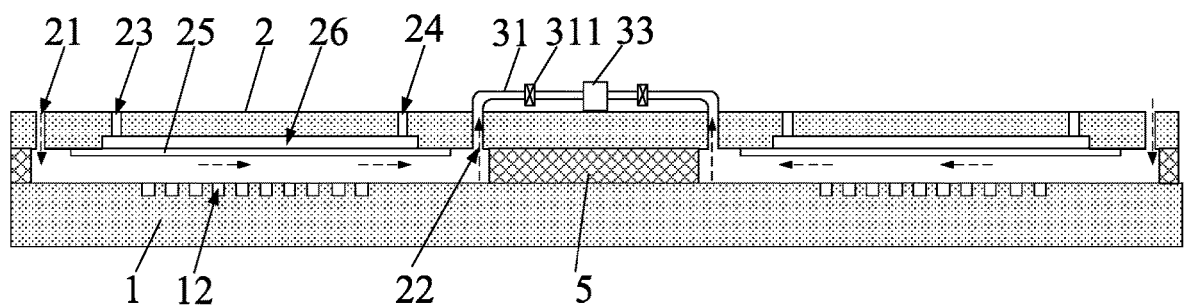
FIG. 8 is a schematic structural diagram of a specific configuration of a connector in a high-throughput test chip provided by an embodiment of the disclosure.

In an optional implementation, as shown in FIG. 8, which is a schematic diagram of a specific structure of accommodation chambers and a connector in a high-throughput test chip provided by an embodiment of the disclosure. In the test system, the liquid outlets 22 of the accommodation chambers 11 are formed in the cover plate 2 and run through the cover plate 2 in an arrangement direction of the cover plate 2 and the backplane 1, that is, the liquid outlets 22 run through a thickness direction of the cover plate 2, the pipelines 31 in the connector 3 are connecting pipes, each connecting pipe is located on the side of the cover plate 2 facing away from the backplane 1, and the sample liquid outlet 33 is formed in the side of the cover plate 2 facing away from the backplane.

In some embodiments, the pipelines 31 in the connector 3 and the cover plate 2 may be detachably connected, in this way, a composing mode of each pipeline group in the connector 3 may be changed whenever possible according to demands of working conditions, a corresponding relation between each pipeline group and the accommodation chamber 11 is adjusted, and the flexibility of the above high-throughput test chip during use is further improved.

Furthermore, in the structure of the connector, the valve structure 311 arranged on each pipeline 31 may be an electromagnetic valve, a switch valve and other structures, arrangement and maintenance are convenient.

Figure 9:
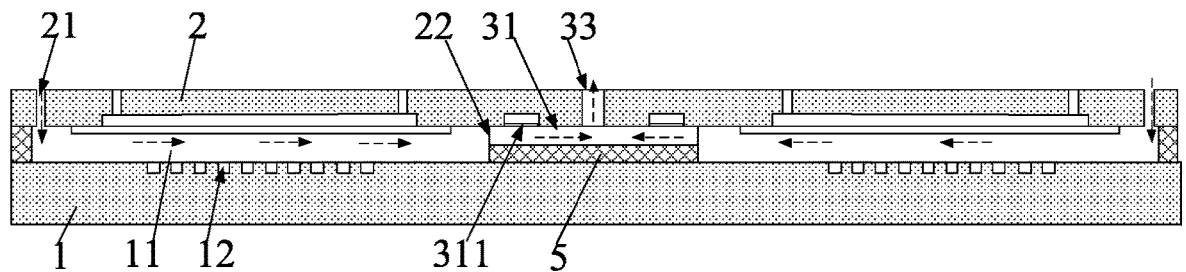
FIG. 9 is a schematic structural diagram of another specific configuration of a connector in a high-throughput test chip provided by an embodiment of the disclosure.

In a second optional implementation, as shown in FIG. 9, which is a schematic diagram of another specific structure of accommodation chambers and a connector in a high-throughput test chip provided by an embodiment of the disclosure. When the backplane 1 and the cover plate 2 of the above high-throughput test chip are connected through the sealant layer 5, a first groove is formed on the surface of the sealant layer 5 facing away from the backplane 1 with a groove bottom and two opposite side walls and an opening facing the cover plate 2, the cover plate 2 covers the first groove, a surface of the cover plate 2 facing the backplane 1 and the first groove are matched to form the pipeline 31 of the connector 3. One end of the pipeline 31 communicating with the accommodation chambers 11 forms the liquid outlet 22 of the accommodation chamber 11, and the sample liquid outlet 33 which is in one-to-one correspondence with the pipeline group is formed in the cover plate 2.

The connector assembly 3 is formed between the cover plate 2 and the backplane 1, so that a size of the high-throughput test chip in a thickness direction can be reduced. Moreover, a structure of a surface of the high-throughput test chip can be simplified, and cleaning and maintenance are convenient.

Figure 10:
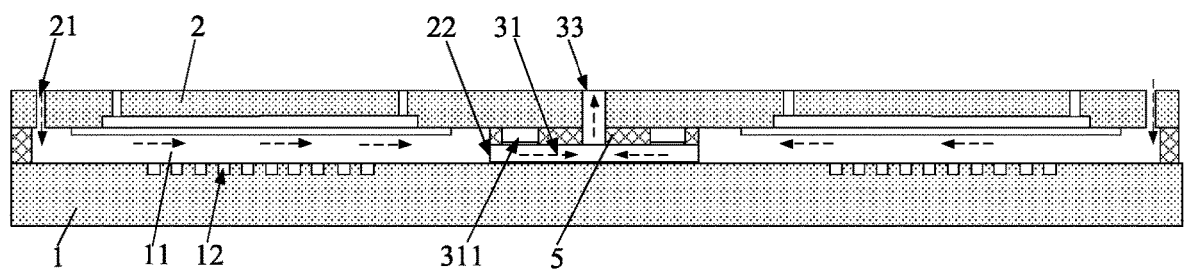
FIG. 10 is a schematic structural diagram of another specific configuration of a connector in a high-throughput test chip provided by an embodiment of the disclosure.

In a third optional implementation, as shown in FIG. 10, which is a schematic diagram of another specific structure of accommodation chambers and a connector in a high-throughput test chip provided by an embodiment of the disclosure. When the backplane 1 and the cover plate 2 which the above high-throughput test chip has are connected through the sealant layer 5, a first groove is formed on a surface of the sealant layer 5 facing the backplane 1 with a groove bottom and two opposite side walls and an opening facing the backplane 1, the backplane 1 covers the first groove, a surface of the backplane 1 facing the cover plate 2 and the first groove are matched to form pipelines 31 of the connector 3. One end of the pipeline 31 communicating with the accommodation chamber 11 forms the liquid outlet 22 of the accommodation chamber 11, and the sample liquid outlet 33 which is in one-to-one correspondence with the pipeline group is formed in the cover plate 2.

Figure 11:
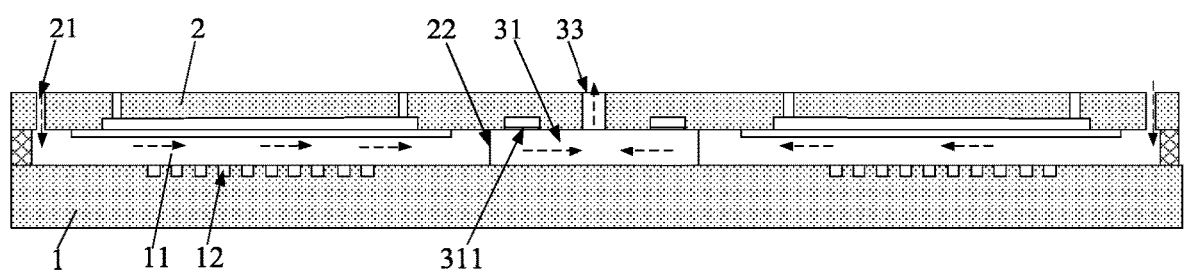
FIG. 11 is a schematic structural diagram of another specific configuration of a connector in a high-throughput test chip provided by an embodiment of the disclosure.

In a fourth optional implementation, as shown in FIG. 11, which is a schematic diagram of another specific structure of accommodation chambers and a connector in a high-throughput test chip provided by an embodiment of the disclosure. When the backplane 1 and the cover plate 2 which the above high-throughput test chip has are connected through the sealant layer 5, the sealant layer 5 is provided with a first groove running through a thickness direction of the sealant layer. The first groove has two opposite side walls. The backplane 1 covers an opening of the first groove facing the backplane 1, and the cover plate 2 covers an opening of the first groove facing the cover plate 2. The surface of the backplane 1 facing the cover plate 2, the surface of the cover plate 2 facing the backplane 1 and the first groove are matched to form the pipeline 31 of the connector 3. The end of the pipeline 31 communicating with the accommodation chamber 11 forms the liquid outlet 22 of the accommodation chamber 11, and the sample liquid outlet 33 which is in one-to-one correspondence with the pipeline group is formed in the cover plate 2.

Furthermore, when the high-throughput test chip in the above second optional implementation, third optional implementation and fourth optional implementation adopts the above connector, the valve structures 311 arranged on the pipelines 31 in the connector 3 may be an air valve, a response speed of the air valve is high, and no contamination is caused to an internal space of the pipeline 31.

Figure 12:
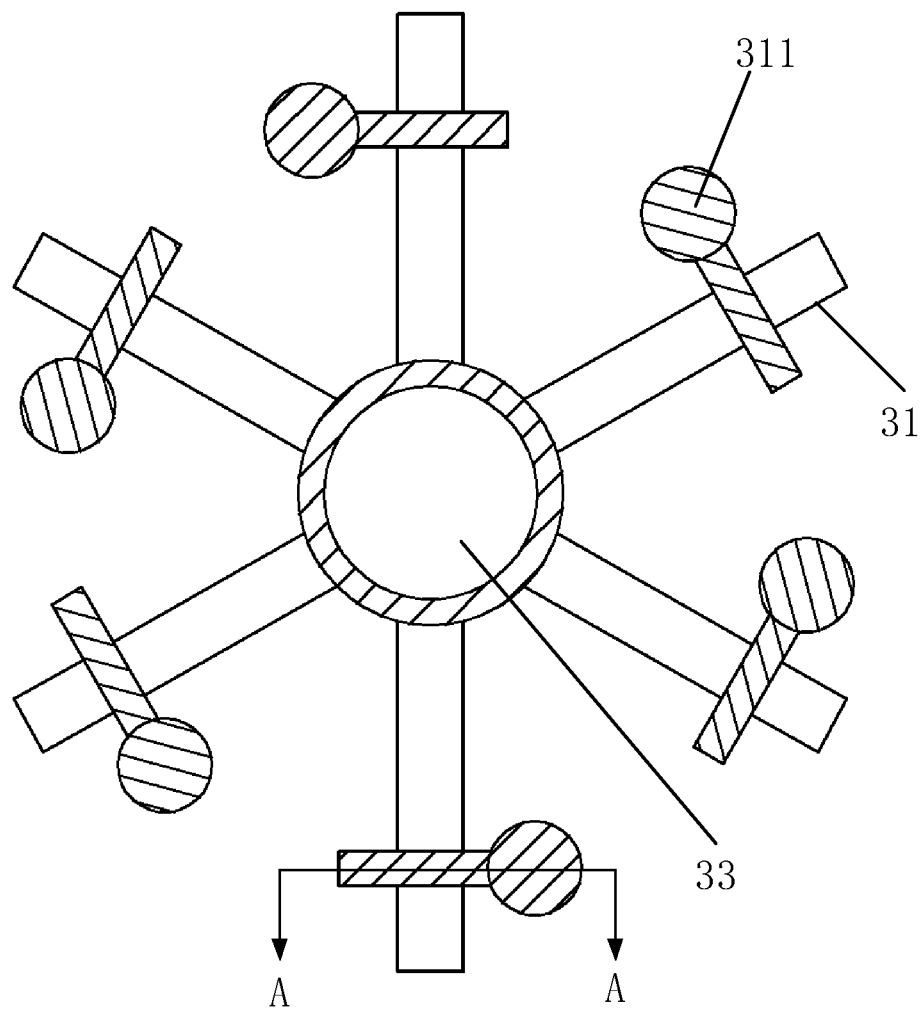
FIG. 12 is a specific schematic structural diagram of a connector in a high-throughput test chip provided by an embodiment of the disclosure.

In some embodiments, taking an arrangement mode of the connector 3 in the high-throughput test chip of the structure shown in FIG. 1, a mode of arranging the air valve on each pipeline 31 in the connector 3 is shown in FIG. 12.

Figure 13:
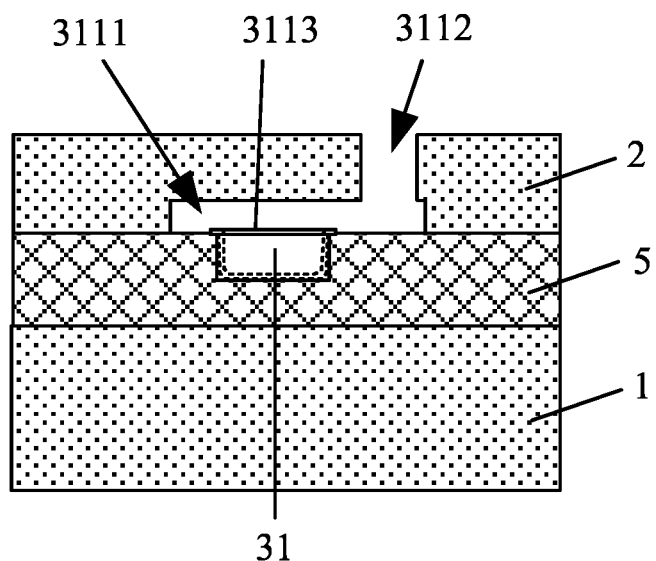
FIG. 13 is a schematic structural diagram of a valve structure in the connector shown in FIG. 10.

In an optional implementation, a structure of the air valve is shown in FIG. 13, in each pair of mutually corresponding air valve and pipeline 31:

the air valve includes an elastic valve sheet 3113, an edge of the elastic valve sheet 3113 is in seal fit with the cover plate 2 so that the elastic valve sheet 3113 and the cover plate 2 are matched to form a pneumatic control chamber 3111, and an orthographic projection of the elastic valve sheet 3113 on the sealant layer 5 covers the above first groove in an arrangement direction of the two side walls which the above first groove has: the cover plate 2 is provided with a through hole, and the through hole communicates with the pneumatic control chamber 3111 and is configured as a pneumatic control air inlet 3112: and when air with a set pressure is injected into the pneumatic control chamber 3111 from the pneumatic control air inlet 3112, the elastic valve sheet 3113 is configured to deform so as to extend into the first groove and be attached to the groove bottom and the two side walls of the first groove, thus the pipeline 31 formed between the first groove and the cover plate 2 is blocked, and a deformation process of the elastic valve sheet 3113 is to change from a shape indicated in a solid line part in FIG. 13 to a shape indicated in a dotted line.

The elastic valve sheet 3113 may be an elastic deformation film. In some embodiments, polydimethylsiloxane may be selected as a material of the elastic deformation film.

In some embodiments, please refer to FIG. 13 by combining with FIG. 12, in each pair of mutually corresponding air valve and pipeline 31, an orthographic projection of the pneumatic control air inlet 3112 on the backplane 1 does not overlap with an orthographic projection of the first groove on the backplane 1.

Figure 14:
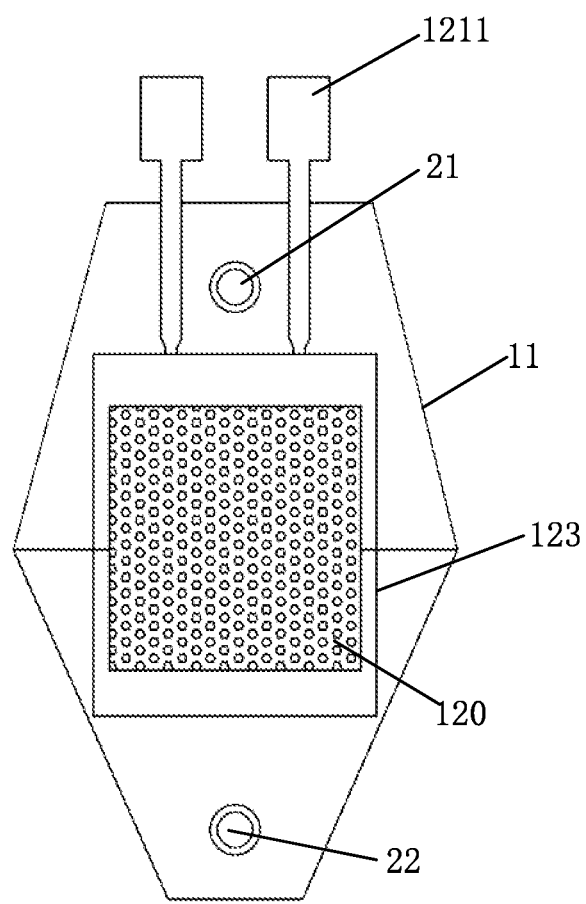
FIG. 14 is a specific schematic structural diagram of a test chip unit in a high-throughput test chip provided by an embodiment of the disclosure.

On the basis of the test system provided by each of the above implementations, in an implementation, as shown in FIG. 14, a specific structure of the test chip unit 12 may include: a plurality of reaction chambers 120 distributed in array, a temperature control layer 123 used for performing temperature adjustment on the reaction chambers 120 and a voltage control unit 1211 used for controlling a voltage of the temperature control layer, a temperature of the temperature control layer 123 is controlled through the voltage control unit 1211, and thus adjustment of the temperature of the reaction chambers 120 is realized.

In the above test system, there may be various arrangement modes between the test chip unit 12 and the backplane 1.

Mode 1, the test chip unit 12 and the backplane 1 are detachably connected, the mode enables the replacement of the test chip unit 12 according to actual demands, for example, if the test chip unit 12 is contaminated, the same type of test chip is substituted, for example, different types of test chip units 12 may be substituted.

In a specific implementation, card slots (not shown in figures) in one-to-one correspondence with the test chip units 12 are formed on the surface of the backplane 1 facing the cover plate 2, and in each pair of mutually corresponding card slot and test chip, the test chip is installed in the card slot.

Mode 2, the test chip unit 12 is directly formed on the surface of the backplane 1 facing the cover plate 2, that is, the backplane 1 is directly used as a substrate, and the test chip is directly formed on the backplane 1 through a preparation process.

The preparation process of mode 2 above can be seen as shown in FIG. 15 to FIG. 18, and material and a preparation process of the above film layers are described in detail as follows.

Figure 15:
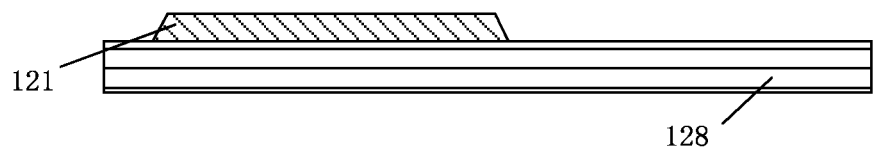
FIG. 15 to FIG. 18 are structural diagrams illustrating a preparation method of a test chip unit in a high-throughput test chip provided by embodiments of the disclosure.

Referring to FIG. 15, a surface of a first substrate 128 for facing the cover plate 2 is cleaned, a metal layer is formed on the first substrate 128 through deposition, and a control circuit 121 used for controlling the temperature of the temperature control layer 123 is formed through a patterning process. The control circuit 121 includes the voltage control unit 1211 mentioned in the above embodiment, the metal layer may be made of molybdenum (Mo) and aluminum (Al), for example, a Mo—Al—Mo stack, and a thickness of each layer may be selected according to actual demands.

Figure 16:
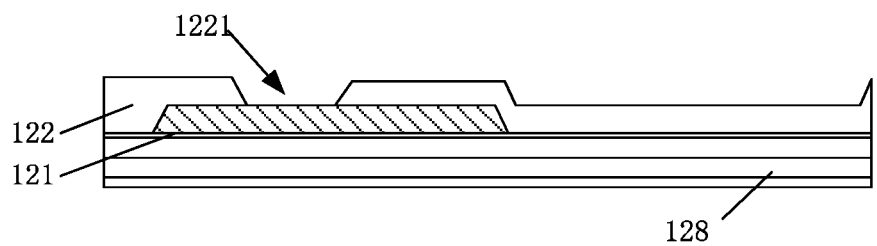

Referring to FIG. 16, a first passivation layer 122 is formed on the control circuit 121, and the first passivation layer 122 is etched to form a via hole 1221 so as to expose the above control circuit 121.

Figure 17:
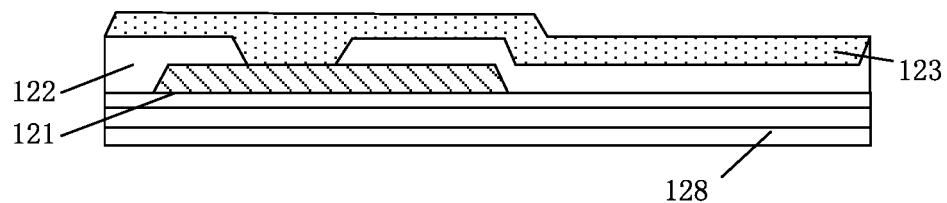

Referring to FIG. 17, the temperature control layer 123 is formed on the first passivation layer 122 through sputtering, for example, the temperature control layer 123 may be made of indium tin oxide (ITO). Heating power is changed by controlling different thicknesses of ITO and patterning design of a resistor of the temperature control layer, and thus temperature uniformity is improved.

Figure 18:
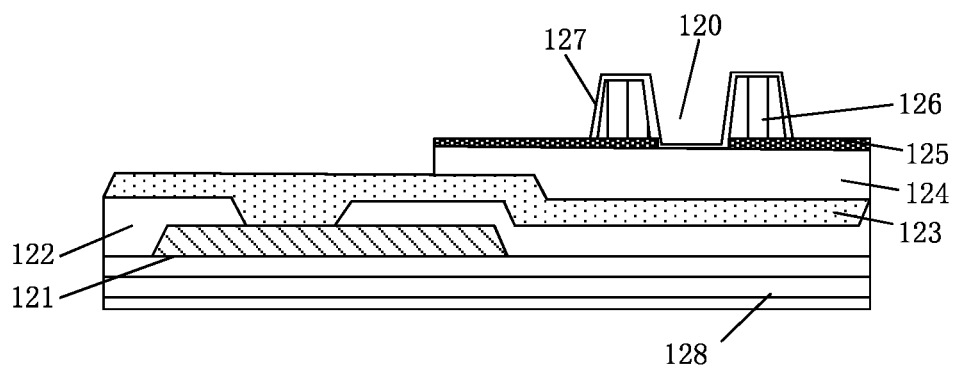

Referring to FIG. 18, a second passivation layer 124 is prepared on the temperature control layer 123 and configured to protect the temperature control layer 123 so as to prevent the to-be-tested liquid from eroding the temperature control layer 123. Besides, the second passivation layer 124 may also be used for planarization, then a black matrix 125 and a defining layer 126 are formed in sequence. For example, a material of the defining layer 126 may be photoresist, a one-time patterning process is performed on the photoresist to obtain the defining layer 126, exposure and developing are performed on the photoresist by using a mask, and thus the plurality of reaction chambers 120 are formed in the photoresist. A hydrophilic layer 127 is formed on the reaction chambers 120. For example, a material of the hydrophilic layer 127 is silicon dioxide ($SiO_2$) or silicon nitride ($SiN_x$) and the like. Silicon dioxide and silicon nitride both have hydrophilicity. The hydrophilic layer 127 may also be prepared from other suitable materials as long as it can be guaranteed that one side of the hydrophilic layer 127 away from the defining layer 126 has hydrophilicity.

So preparation of the test chip is completed.

Figure 19:
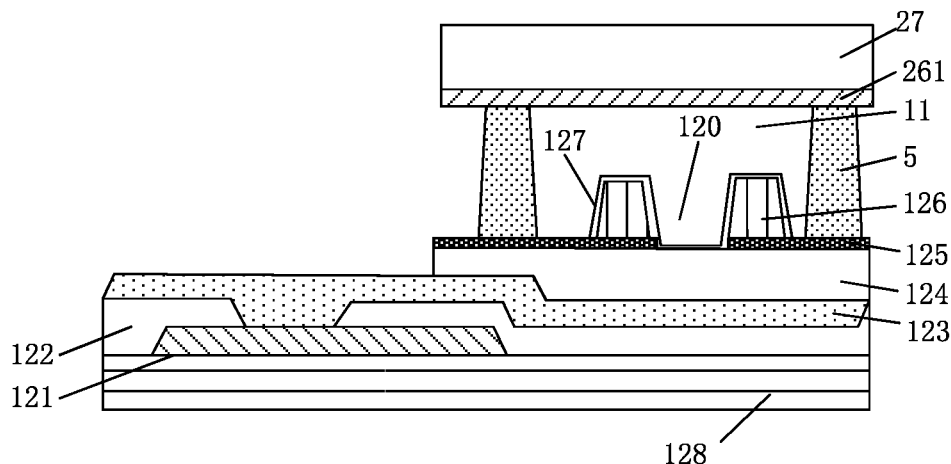
FIG. 19 is a specific schematic structural diagram of an accommodation chamber in a high-throughput test chip provided by an embodiment of the disclosure.

Certainly, after the test chip unit 12 is prepared, the cover plate 2 and the backplane 1 need to be aligned. Referring to FIG. 19, the sealant layer 5 is formed on the black matrix 125. A material of the sealant layer 5 may be a UV adhesive or other suitable materials. After the backplane 1 and the second substrate 27 are subjected to curing and packaging through the sealant layer 5, the sealant layer 5 may be configured to support a space between the backplane 1 and the cover plate 2, and a third passivation layer 261 is formed on a surface of the second substrate 27 facing the backplane 1.

The first passivation layer 122, the second passivation layer 124 and the third passivation layer 261 here may be all prepared from the same insulation material, for example, silicon dioxide or silicon nitride and the like may be adopted.

In a use process of the test system provided by each of the above implementations, each reaction chamber 120 of the test chip unit 12 needs to be blocked, a common practice is that the accommodation chambers 11 and the like are subjected to oil sealing by using mineral oil through secondary sample injection, however, an oil-phase liquid-seal mode is complicated in process, cumbersome in operation and instable in effect. Therefore, accuracy of a test result will be improved by designing a flexibly adjusted air valve and segmenting the reaction chambers, and operation is convenient.

Figure 20:
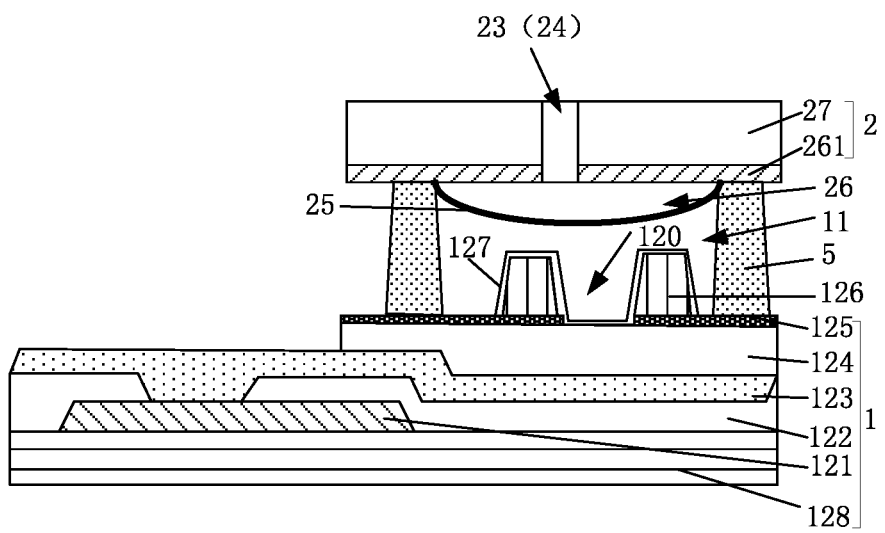
FIG. 20 is another specific schematic structural diagram of an accommodation chamber in a high-throughput test chip provided by an embodiment of the disclosure.
Figure 21:
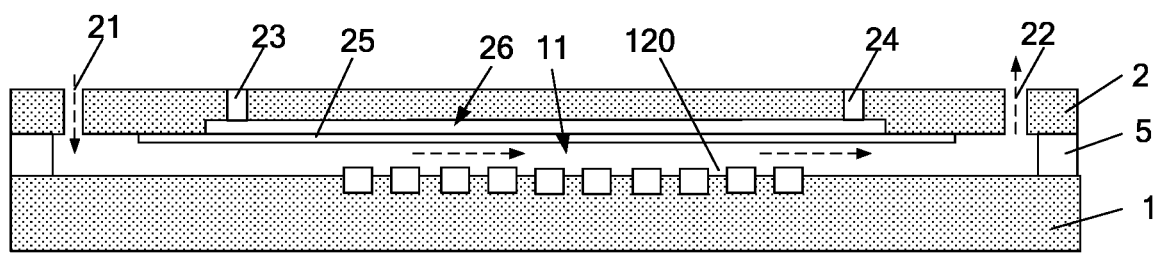
FIG. 21 is a schematic structural diagram of a high-throughput test chip in a using state provided by an embodiment of the disclosure.
Figure 22:
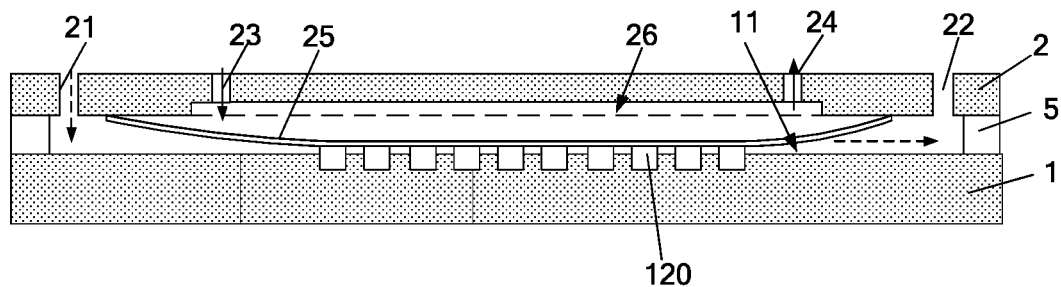
FIG. 22 is a schematic structural diagram of a backplane in another using state provided by an embodiment of the disclosure.

A specific structure in the test chip is described specifically below:

Please refer to FIG. 20. FIG. 21 and FIG. 22, in the test system provided by the embodiment of the disclosure, flexible elastic films 25 in one-to-one correspondence with the accommodation chambers 11 are disposed on one side of the cover plate 2 facing the backplane 1, the flexible elastic films 25 are located in the accommodation chambers 11, and the edges of the flexible elastic films 25 are in seal connection with the surface of the cover plate 2 facing the backplane 1, so that an air channel space 26 is formed between the flexible elastic films 25 and the cover plate 2: in each pair of mutual corresponding flexible elastic films 25 and the accommodation chambers 11, an orthographic projection of the flexible elastic films 25 on the backplane 1 covers the test chip units 12 in the accommodation chambers 11, an orthographic projection of the liquid inlets 21 and the liquid outlets 22 of the accommodation chambers 11 on the backplane 1 does not overlap with an orthographic projection of the air channel space 26 on the backplane 1. In some embodiments, an orthographic projection of the liquid inlets 21 on the backplane 1 is located on one side of an orthographic projection of the air channel space 26 on the backplane 1, and an orthographic projection of the liquid outlets 22 on the backplane 1 is located on the other side of the orthographic projection of the air channel space 26 on the backplane 1.

The cover plate 2 is provided with an air inlet 23 and an air outlet 24 running through a thickness direction of the cover plate corresponding to a region of the air channel space 26, and the air inlet 23 and the air outlet 24 communicate with only the air channel space 26, so that the flexible elastic films 25 deform when air is injected from the air inlet 23 to cover all the reaction chambers 120 of the test chip units 12.

In the test system provided by the above technical solution, when the test system provided by the embodiment of the disclosure is used, as shown in FIG. 21 and FIG. 22, a dotted line arrow in FIG. 21 represents a flowing direction of the sample liquid, firstly, the air inlet 23 and the air outlet 24 are closed, and the sample liquid is injected into the accommodation chamber 11 from the liquid inlet 21 through the liquid inlet 21 till the sample liquid fully fills the whole accommodation chamber 11 and makes full contact with the plurality of reaction chambers 120 of the test chip unit 12: then as shown FIG. 22, the air inlet 23 is opened, the air outlet 24 is closed, air with a certain pressure enters the air channel space 26 from the air inlet 23, pressure is exerted on the flexible elastic films 25 to make the flexible elastic films 25 deform, meanwhile, superfluous sample liquid is released from the liquid outlet 22 till the flexible elastic films 25 completely cover all the reaction chambers 120 of the test chip unit 12, sample liquid in each reaction chamber 120 cannot flow out due to a capillary action, thus each reaction chamber 120 is separated, thus separation effectiveness, stability and flexibility of the reaction chambers 120 are improved, operation is simpler and more convenient, and stable, sensitive and non-invasive test is performed on the sample liquid.

In some embodiments, please continue referring to FIG. 21 and FIG. 22, in each of the accommodation chambers 11, an orthographic projection of the air inlet 23 and the air outlet 24 in the cover plate 2 on the backplane 1 does not overlap with an orthographic projection of the test chip units 12 on the backplane 1. In some embodiments, an orthographic projection of the air inlet 23 on the backplane 1 is located on one side of the orthographic projection of the test chip unit 12 on the backplane 1, and an orthographic projection of the air outlet 24 on the backplane 1 is located on the other side of the orthographic projection of the test chip unit 12 on the backplane 1.

In an optional implementation, the edges of the flexible elastic films 25 are in bonding connection with the surface of the cover plate 2 facing the backplane 1.

In some embodiments, a thickness of the flexible elastic film 25 is 5 μm to 90 μm.

The flexible elastic film 25 can deform through a given pressure and can cover the reaction chamber 120. The flexible elastic film 25 is supposed to have elastic deformation performance and follows the Hooke's law ($\sigma=E*\varepsilon$ and $\sigma=P*S$: $\sigma$ is stress, E is elasticity modulus/Young modulus, $\varepsilon$ is strain, P is pressure intensity of gas, and S is the area of the flexible elastic film 25). In some embodiments, polydimethylsiloxane may be selected as a material of the flexible elastic film 25.

As shown in FIG. 21 and FIG. 22, in order to conveniently form the air channel space 26, the cover plate 2 is configured to form an air injecting groove in a surface of the part of the air channel space 26 facing the backplane 1, the flexible elastic films 25 cover an opening of the air injecting groove, and the orthographic projection of the air inlet 23 and the air outlet 24 on the backplane 1 is located in an orthographic projection of the air injecting groove on the backplane 1.

In some embodiments, the orthographic projection of the air injecting groove on the backplane 1 covers the orthographic projection of the test chip unit 12 on the backplane, and the orthographic projection of the flexible elastic film 25 on the backplane 1 covers the orthographic projection of the air injecting groove on the backplane 1.

As shown in FIG. 21 and FIG. 22, in each accommodation chamber 11, a projection of the air injecting groove on the backplane 1 covers all the reaction chambers 120 of the test chip unit 12 in the accommodation chamber 11.

In some embodiments, a depth of the air injecting groove is 20 μm to 1000 μm in a direction perpendicular to the cover plate 2.

Apparently, those skilled in the art can make various changes and transformations to the embodiments of the disclosure without departing from the spirit and scope of the disclosure. In this case, if these changes and transformations of the disclosure fall within the scope of the claims and their equivalents, the disclosure also intends to contain these changes and transformations.

What is claimed is:

1. A high-throughput test chip, comprising:
    a backplane;
    a cover plate; and
    a connector;
    wherein
        the backplane is opposite to the cover plate, and the backplane and the cover plate are aligned to form a plurality of accommodation chambers;
        the backplane comprises test chip units in one-to-one correspondence with the plurality of accommodation chambers disposed on a side of the backplane facing the cover plate, and each of the test chip units is located in a corresponding accommodation chamber;
        each of the plurality of accommodation chambers is provided with a liquid inlet and a liquid outlet;
        the connector comprises pipelines in one-to-one correspondence with the plurality of accommodation chambers, and each of the pipelines comprises a valve structure for controlling connection or disconnection of the pipeline;
        for each pair of a pipeline and an accommodation chamber corresponding to the pipeline, an inlet of the pipeline communicates with the liquid outlet of the accommodation chamber corresponding to the pipeline; and
        the pipelines form at least one pipeline group, wherein each pipeline group at least comprises two pipelines, and the pipelines in each of the pipeline groups share a same sample liquid outlet;
wherein the backplane and the cover plate are connected through a sealant layer, and the plurality of accommodation chambers are separated by the sealant layer;
wherein the sealant layer comprises a first groove formed on a surface of the sealant layer facing away from the backplane;
wherein the first groove comprises a groove bottom, two opposite side walls, and an opening facing the cover plate;
the cover plate covers the first groove, a surface of the cover plate facing the backplane and the first groove are matched to form the pipeline of the connector, an end of the pipeline communicating with the accommodation chamber forms the liquid outlet of the accommodation chamber; and
a sample liquid outlet which is in one-to-one correspondence with the pipeline group is formed in the cover plate.

2. The high-throughput test chip according to claim 1, wherein
the liquid outlet of the accommodation chamber is formed in the cover plate;
the pipeline in the connector is a connecting pipe; and
the connecting pipe is on a side of the cover plate facing away from the backplane.

3. The high-throughput test chip according to claim 1, wherein the valve structure comprises an air valve.

4. The high-throughput test chip according to claim 3, wherein in each pair of mutually corresponding air valve and pipeline:
the air valve comprises an elastic valve sheet, wherein an edge of the elastic valve sheet is in seal fit with the cover plate so that the elastic valve sheet and the cover plate are matched to form a pneumatic control chamber;
an orthographic projection of the elastic valve sheet on the sealant layer covers the first groove in an arrangement direction of the two side walls;
the cover plate is provided with a through hole, and the through hole communicates with the pneumatic control chamber and is configured as a pneumatic control air inlet; and
when air with a set pressure is injected into the pneumatic control chamber from the pneumatic control air inlet, the elastic valve sheet is configured to deform so as to extend into the first groove and be attached to the groove bottom and the two side walls of the first groove.

5. The high-throughput test chip according to claim 4, wherein in each pair of mutually corresponding air valve and pipeline, an orthographic projection of the pneumatic control air inlet on the backplane does not overlap with an orthographic projection of the first groove on the backplane.

6. The high-throughput test chip according to claim 1, wherein at least one card slot is provided in a surface of the backplane facing the cover plate, and the test chip unit is installed in the card slot.

7. The high-throughput test chip according to claim 6, wherein the plurality of card slots are arranged in array.

8. The high-throughput test chip according to claim 6, wherein the plurality of card slots are arranged annularly with the sample liquid outlet of the connector as a center.

9. The high-throughput test chip according to claim 1, wherein the test chip unit is formed on a surface of the backplane facing the cover plate.

10. The high-throughput test chip according to claim 1, wherein the test chip unit comprises a plurality of reaction chambers;
wherein the cover plate is provided with flexible elastic films in one-to-one correspondence with the accommodation chambers on a side of the cover plate facing the backplane;
wherein the flexible elastic film is located in the accommodation chamber, and an edge of the flexible elastic film is in seal connection with a surface of the cover plate facing the backplane so that an air channel space is formed between the flexible elastic film and the cover plate;
in each pair of mutually corresponding flexible elastic film and accommodation chamber, an orthographic projection of the flexible elastic film on the backplane covers the test chip unit in the accommodation chamber, and an orthographic projection of the liquid inlet and the liquid outlet of the accommodation chamber on the backplane does not overlap with an orthographic projection of the air channel space on the backplane; and
the cover plate comprises an air inlet and an air outlet running through a thickness direction of the cover plate in a region corresponding to the air channel space; and
the air inlet and the air outlet communicate with only the air channel space, so that the flexible elastic film deforms when air is injected from the air inlet to cover all of the plurality of reaction chambers of the test chip unit.

11. The high-throughput test chip according to claim 10, wherein in the accommodation chamber, an orthographic projection of the air inlet and the air outlet in the cover plate on the backplane does not overlap with an orthographic projection of the test chip unit on the backplane.

12. The high-throughput test chip according to claim 10, wherein the edge of the flexible elastic film is in bonding connection with the surface of the cover plate facing the backplane.

13. The high-throughput test chip according to claim 10, wherein a thickness of the flexible elastic film is 5 μm-90 μm.

14. The high-throughput test chip according to claim 10, wherein the cover plate comprises an air injecting groove in a surface of a part of the cover plate corresponding to the air channel space facing the backplane;
wherein the flexible elastic film covers an opening of the air injecting groove, and the orthographic projection of the air inlet and the air outlet on the backplane is located in an orthographic projection of the air injecting groove on the backplane.

15. The high-throughput test chip according to claim 14, wherein in the accommodation chamber, a projection of the air injecting groove on the backplane covers all of the plurality of reaction chambers of the test chip unit in the accommodation chamber.

16. The high-throughput test chip according to claim 14, wherein in a direction perpendicular to the cover plate, a depth of the air injecting groove is 20 μm to 1000 μm.

17. The high-throughput test chip according to claim 1, wherein the test chip unit further comprises a temperature control layer and a plurality of reaction chambers; wherein the temperature control layer is disposed on the backplane and configured to heat the plurality of reaction chambers.

18. The high-throughput test chip according to claim 17, wherein the test chip unit further comprises a voltage control unit, and the voltage control unit is electrically connected with the temperature control layer.

* * * * *